United States Patent
Haneda

(10) Patent No.: US 10,421,372 B2
(45) Date of Patent: Sep. 24, 2019

(54) ELECTRIC POWER TRADE BROKERING SYSTEM, NON-TRANSITORY COMPUTER READABLE MEDIUM STORING PROGRAM AND ELECTRIC POWER TRADE BROKERING METHOD

(71) Applicant: HONDA MOTOR CO., LTD., Tokyo (JP)

(72) Inventor: Satoshi Haneda, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/292,329

(22) Filed: Mar. 5, 2019

(65) Prior Publication Data

US 2019/0193587 A1 Jun. 27, 2019

Related U.S. Application Data

(63) Continuation of application No. PCT/JP2017/040955, filed on Nov. 14, 2017.

(30) Foreign Application Priority Data

Nov. 25, 2016 (JP) .................. 2016-229470

(51) Int. Cl.
*B60L 53/64* (2019.01)
*G06Q 10/06* (2012.01)
(Continued)

(52) U.S. Cl.
CPC .......... *B60L 53/64* (2019.02); *G06Q 10/0631* (2013.01); *G06Q 10/06311* (2013.01);
(Continued)

(58) Field of Classification Search
CPC ........................................ B60L 53/64
See application file for complete search history.

(56) References Cited

U.S. PATENT DOCUMENTS 6,009,403 A 12/1999 Sato
2010/0256846 A1 10/2010 Shaffer
(Continued)

FOREIGN PATENT DOCUMENTS

JP 2011221817 A 11/2011
JP 2012182872 A 9/2012
(Continued)

OTHER PUBLICATIONS

International Search Report and Written Opinion of the International Search Authority (ISA/237) for International Patent Application No. PCT/JP2017/040955, mailed by the Japan Patent Office dated Apr. 17, 2018.
(Continued)

*Primary Examiner* — Tejal Gami

(57) ABSTRACT

An electric power trade brokering system includes: a task information acquiring unit that acquires task information about a plurality of tasks of a moving body on which a storage battery is mounted and that is movable by utilizing electric power provided from the storage battery; and a trade counterparty determining unit that determines, based on the task information acquired by the task information acquiring unit, a counterparty to trade electric power with the moving body at a position where at least one task among the plurality of tasks is carried out.

11 Claims, 7 Drawing Sheets

(51) Int. Cl.
*G06Q 10/10* (2012.01)
*G06Q 30/06* (2012.01)
*G06Q 50/06* (2012.01)
*H02J 3/14* (2006.01)

(52) U.S. Cl.
CPC ........... *G06Q 10/109* (2013.01); *G06Q 30/06* (2013.01); *G06Q 50/06* (2013.01); *B60L 2240/72* (2013.01); *B60L 2250/14* (2013.01); *B60L 2260/50* (2013.01); *H02J 2003/146* (2013.01)

(56) References Cited

U.S. PATENT DOCUMENTS

| | | |
|---|---|---|
| 2014/0005848 A1 | 1/2014 | Melen |
| 2014/0288832 A1 | 9/2014 | Hoch |

FOREIGN PATENT DOCUMENTS

| | | |
|---|---|---|
| JP | 2012244784 A | 12/2012 |
| JP | 2013046524 A | 3/2013 |
| JP | 2013073398 A | 4/2013 |
| JP | 2013186519 A | 9/2013 |
| JP | 2015060546 A | 3/2015 |
| WO | 9706522 A1 | 2/1997 |

OTHER PUBLICATIONS

Office Action issued for counterpart Japanese Application No. 2016-229470, issued by the Japan Patent Office dated Oct. 10, 2017 (drafted on Oct. 4, 2017).

Office Action issued for counterpart Japanese Application No. 2016-229470, issued by the Japan Patent Office dated Aug. 1, 2017 (drafted on Jul. 27, 2017).

FIG. 5

| MOBILE BODY ID | TASK ID | TASK INFO. | | |
|---|---|---|---|---|
| | | POSITION | TIME | ACTION |
| M001 | T001 | BEAUTY PARLOR C | 10/13 12:00 | ARRIVE AT DESIGNATED POSITION BEFORE DESIGNATED TIME |
| M001 | T002 | BEAUTY PARLOR C | 10/13 13:30 | LEAVE DESIGNATED POSITION BEFORE DESIGNATED TIME |
| M001 | T003 | MOVIE THEATER B | 10/13 14:00 | ARRIVE AT DESIGNATED POSITION BEFORE DESIGNATED TIME |
| M001 | T004 | MOVIE THEATER B | 10/13 18:00 | LEAVE DESIGNATED POSITION BEFORE DESIGNATED TIME |
| M001 | T005 | RESTAURANT A | 10/13 19:00 | ARRIVE AT DESIGNATED POSITION BEFORE DESIGNATED TIME |
| M001 | T006 | RESTAURANT A | 10/13 21:30 | LEAVE DESIGNATED POSITION BEFORE DESIGNATED TIME |
| M001 | T007 | HOME | 10/13 22:00 | ARRIVE AT DESIGNATED POSITION BEFORE DESIGNATED TIME |

*FIG. 7*

| TRADE ID | TRADE INFO. | | | | |
|---|---|---|---|---|---|
| | POSITION | PERIOD | ELECTRIC POWER SUPPLY SIDE ID | ELECTRIC POWER RECEIVING SIDE ID | TRADE CONDITION |
| Tr001 | BEAUTY PARLOR C | 10/13 12:20—13:20 | M002 | M001 | *,* |
| Tr002 | MOVIE THEATER B | 10/13 12:20—13:20 | M001 | M003 | *,* |
| Tr003 | MOVIE THEATER B | 10/13 12:20—13:20 | M004 | M001 | *,* |

700, 702, 704, 712, 714, 716, 718, 720

ELECTRIC POWER TRADE BROKERING SYSTEM, NON-TRANSITORY COMPUTER READABLE MEDIUM STORING PROGRAM AND ELECTRIC POWER TRADE BROKERING METHOD

CROSS REFERENCE TO RELATED APPLICATION

This is a continuation application of International Application No. PCT/JP2017/040955, filed on Nov. 14, 2017, which claims priority to Japanese Patent Application No. 2016-229470, filed on Nov. 25, 2016, the contents of each of which are incorporated herein by reference.

1. TECHNICAL FIELD

The present invention relates to an electric power trade brokering system, a program and an electric power trade brokering method.

2 RELATED ART

Systems for effectively utilizing waiting time while an electric automobile is being charged at a stationary electric power charging station have been known (for example, please see Patent Documents 1 to 5).
Patent Document 1: Japanese Patent Application Publication No. 2012-182872
Patent Document 2: Japanese Patent Application Publication No. 2013-046524
Patent Document 3: Japanese Patent Application Publication No. 2013-073398
Patent Document 4: Japanese Patent Application Publication No. 2013-186519
Patent Document 5: Japanese Patent Application Publication No. 2015-060546
If the above-mentioned systems are utilized, a user needs to make a plan according to locations of electric power charging stations.

SUMMARY

A first aspect of the present invention provides an electric power trade brokering system. The electric power trade brokering system for example includes a task information acquiring unit that acquires task information about a plurality of tasks of a moving body on which a storage battery is mounted and that is movable by utilizing electric power provided from the storage battery. The electric power trade brokering system includes a trade counterparty determining unit that determines, based on the task information acquired by the task information acquiring unit, a counterparty to trade electric power with the moving body at a position where at least one task among the plurality of tasks is carried out.

The electric power trade brokering system may include a plan information acquiring unit that acquires plan information about a plurality of plans of a user of the moving body. The electric power trade brokering system may include a task information generating unit that generates the task information based on the plan information acquired by the plan information acquiring unit. In the electric power trade brokering system, the task information generating unit may determine a position where each among the plurality of tasks of the moving body is carried out and an order in which plurality of tasks of the moving body are carried out. The task information generating unit may generate the task information including information about a position and time at which each among the plurality of tasks of the moving body is carried out.

In the electric power trade brokering system, the trade counterparty determining unit may have an extraction condition determining unit that determines, based on the task information, (i) an electric power amount that the moving body can trade and (ii) a period in which the moving body can trade electric power, for at least one task among the plurality of tasks and at a position where the at least one task is carried out. The trade counterparty determining unit may have an extracting unit that extracts, from a plurality of preregistered candidates, one or more candidates that can trade electric power, the electric power amount of which is determined by the extraction condition determining unit, in the period determined by the extraction condition determining unit at the position where the at least one task is carried out. The trade counterparty determining unit may have a trade schedule determining unit that determines a position, period and counterparty of one or more electric power trades so as to satisfy a predetermined condition based on information about one or more candidates extracted by the extracting unit. The electric power trade brokering system may include a trade condition storing unit that stores, in association with each other, identification information of each candidate, and at least one of information about whether cancellation of a trade is possible or not and information about a cost increase accompanying cancellation of the trade, for each among the plurality of candidates. In the electric power trade brokering system, the extracting unit may extract the one or more candidates from a plurality of candidates stored in the trade condition storing unit.

The electric power trade brokering system may include a change determining unit that determines whether it is necessary or not to change a task of the moving body. In the electric power trade brokering system, if the change determining unit determines that it is necessary to change a task of the moving body, for at least one task among one or more tasks after the change is made, the extraction condition determining unit may determine (i) an electric power amount of electric power that the moving body can trade and (ii) a period in which the moving body can trade electric power, at a position where the at least one task is carried out. The extracting unit may extract, from a plurality of preregistered candidates, one or more candidates that can trade electric power, the electric power amount of which is determined by the extraction condition determining unit, in the period determined by the extraction condition determining unit at the position where the at least one task is carried out. The trade schedule determining unit may determine a position, period and counterparty of one or more electric power trades so as to satisfy the predetermined condition based on information about the one or more candidates extracted by the extracting unit. In the electric power trade brokering system, if a first task is deleted due to a change in a task of the moving body, when it is necessary to cancel at least one among one or more trades related to the first task, the trade schedule determining unit may determine to cancel a trade that is among the one or more trades related to the first task and satisfies a predetermined second condition about at least one of: a cost generated accompanying cancellation of the trade; and an attribute of a counterparty of the trade.

In the electric power trade brokering system, if the change determining unit determines that it is necessary to change a task of the moving body, the task information generating unit may determine a position where each among one or more tasks after the change is made is carried out and an order in which the one or more tasks after the change is made are carried out. The task information generating unit may generate new task information including information about a position and time at which each among the one or more tasks after the change is made is carried out. For the at least one task, the extraction condition determining unit may determine, based on the new task information, (i) an electric power amount of electric power that the moving body can trade and (ii) a period in which the moving body can trade electric power, at the position where the task is carried out. In the electric power trade brokering system, the change determining unit transmits information about a second task to the moving body or a communication terminal of a user of the moving body at or after a time a predetermined length of time before a planned time of the second task, and before or at the planned time.

A second aspect of the present invention provides a non-transitory computer readable medium storing thereon a program. The program may be a program that causes a computer to function as the electric power trade brokering system. The program may be a program that causes a computer to execute a task information acquiring procedure of acquiring, by means of a computer, task information about a plurality of tasks of a moving body on which a storage battery is mounted and that is movable by utilizing electric power stored in the storage battery; and a trade counterparty determining procedure of determining, by means of a computer and based on the task information acquired in the task information acquiring procedure, a counterparty to trade electric power with the moving body at a position where at least one task among the plurality of tasks is carried out. A non-transitory computer-readable medium having stored thereon the above-mentioned program may be provided.

A third aspect of the present invention provides an electric power trade brokering method. The electric power trade brokering method for example has acquiring, by means of a computer, task information about a plurality of tasks of a moving body on which a storage battery is mounted and that is movable by utilizing electric power stored in the storage battery. The electric power trade brokering method may have determining, by means of a computer and based on the task information acquired in the acquiring, a counterparty to trade electric power with the moving body at a position where at least one task among the plurality of tasks is carried out.

The summary clause does not necessarily describe all necessary features of the embodiments of the present invention. The present invention may also be a sub-combination of the features described above.

BRIEF DESCRIPTION OF DRAWINGS

FIG. 5 schematically shows one example of a data table 500.

FIG. 7 schematically shows one example of a data table 700.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention. In the figures, identical or similar portions are provided with identical reference numbers, and the same explanations are not repeated in some cases.

[Outline of Electric Power Trade Brokering System 100]

Figure 1:
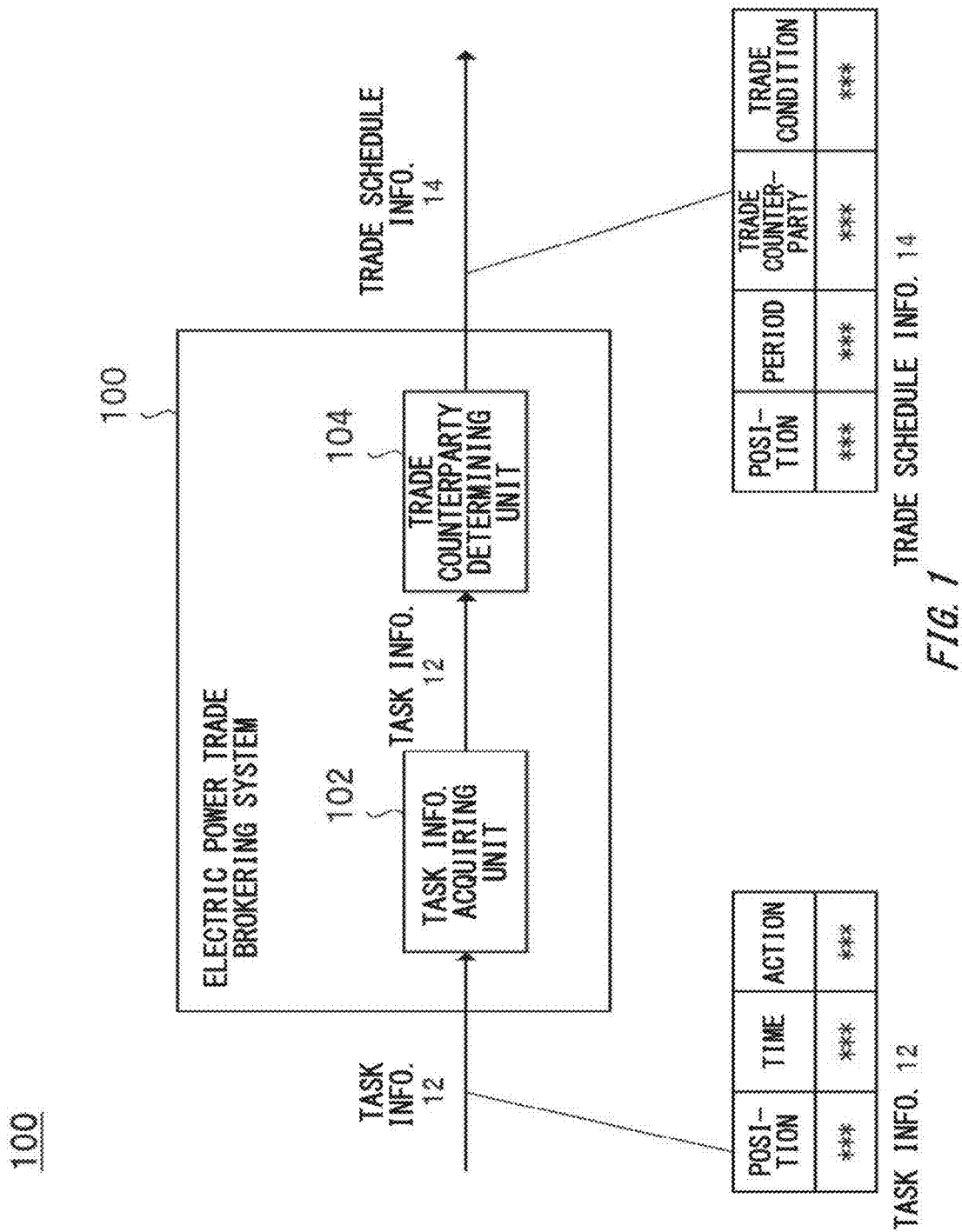
FIG. 1 schematically shows one example of the system configuration of an electric power trade brokering system 100.

FIG. 1 schematically shows one example of the system configuration of an electric power trade brokering system 100. In the present embodiment, the electric power trade brokering system 100 brokers an electric power trade between an electric power supply side and an electric power receiving side. For example, the electric power trade brokering system 100 (i) acquires information about a plan of a user of a moving body, (ii) determines the schedule and location of an electric power trade according to the plan of the user and (iii) brokers the electric power trade in the schedule and at the location. Thereby, while the user is implementing the plan, a storage battery of the moving body can be charged, electric power can be supplied from electric power supply equipment mounted on the moving body to another instrument, and so on.

Examples of the electric power supply equipment may include an electric power storage device, an electric power charging device, an electric power generating device and the like. Examples of the electric power generating device may include (i) an alternator that generates electric power by utilizing an internal combustion engine, (ii) a fuel cell, (iii) a natural force electric power generating system such as a solar electric power generating device; and the like. The electric power supply equipment may be equipment incorporated into the moving body or may be portable equipment that can be mounted on the moving body.

Examples of the moving body may include an automobile, an autobicycle, a marine vessel, a flight vehicle and the like. Examples of the automobile may include an engined vehicle, an electric automobile, a fuel cell vehicle, a hybrid vehicle, a movable working machine and the like. The moving mode of the working machine may be automatic or manual. Examples of the working machine may include a lawn mower, a grass mower, a power tiller, a tractor, hauling equipment, a pump, an atomizer, a cleaning machine, a snow blower and the like.

Examples of the autobicycle may include (i) a motorcycle, (ii) a trimotorcycle, (iii) a standing-ride bicycle having a power unit such as Segway (registered trademark), Kickboard (registered trademark) with a power unit, a skate board with a power unit, and the like. The power units may be (i) an internal combustion engine such as an engine or a prime mover or (ii) a combination of an electric power storage device or electric power generating device and an electric motor. Examples of the marine vessel may include a ship, a hovercraft, a water scooter, a submarine, a submersible vessel, an underwater scooter and the like. Examples of the flight vehicle may include an airplane, an airship or balloon, an air balloon, a helicopter, a drone and the like.

[Explanation of Each Unit of Electric Power Trade Brokering System 100]

In the present embodiment, the electric power trade brokering system 100 includes a task information acquiring unit 102 and a trade counterparty determining unit 104. The electric power trade brokering system 100 for example acquires task information 12 and outputs trade schedule information 14. A route for acquiring the task information 12 is not particularly limited. An output destination for the trade schedule information 14 is not particularly limited.

The task information 12 is information about one or more tasks of a moving body, and includes, for example, information indicating a position where each task is carried out, information indicating a date and time or a time on or at which each task is carried out, and information indicating an action or operation of the moving body in each task. The moving body is not particularly limited, but is preferably a moving body on which a storage battery is mounted and that is movable by utilizing electric power provided from the storage battery. Examples of the information indicating a position may include (i) information indicating a latitude and longitude, (ii) information indicating a latitude, longitude and altitude, (iii) information indicating an address, (iv) information indicating an area having a particular geographical range; and the like.

The trade schedule information 14 includes information about a schedule and location of one or more electric power trades carried out related to one or more tasks. The trade schedule information 14 may include information about a schedule and location of one or more electric power trades carried out related to a plurality of tasks. The trade schedule information 14 includes, for example, information indicating a position where each electric power trade is carried out, information indicating a period in which each electric power trade is carried out, information indicating a counterparty of each electric power trade (which may be sometimes referred to as a trade counterparty), and information indicating a contract condition of each electric power trade (which may be sometimes referred to as a trade condition).

At least one of the time of commencement and the time of termination of a period in which an electric power trade is carried out may be indicated by (i) a date and time, (ii) a time, or (iii) the other of the time of commencement and the time of termination of the period and a required length of time for the electric power trade. At least one of the time of commencement and the time of termination of the above-mentioned period may not be exactly defined. For example, the above-mentioned period may be defined as "After arrival at a particular location at around 7 p.m. and until departure toward a next location at around 8 p.m." The information indicating the trade counterparty only has to be identification information for identifying the trade counterparty, and examples thereof include a full name, a name, a nickname, a membership number, an account, an address and the like.

The task information acquiring unit 102 acquires the task information 12 of a moving body. The task information acquiring unit 102 transmits the task information 12 to the trade counterparty determining unit 104. The trade counterparty determining unit 104 receives the task information 12 from the task information acquiring unit 102. The trade counterparty determining unit 104 determines, based on the task information 12, a counterparty to trade electric power with the moving body at a position where at least one task among one or more tasks is carried out. The trade counterparty determining unit 104 for example associates: (i) the information indicating a position where the above-mentioned at least one task is carried out included in the task information 12, and the information indicating a date and time or a time on or at which the task is carried out included in the task information 12; and (ii) information indicating the trade counterparty, to generate the trade schedule information 14.

[Specific Configuration of Each Unit of Electric Power Trade Brokering System 100]

Each unit of the electric power trade brokering system 100 may be realized by hardware, realized by software, or realized by hardware and software. Each unit of the electric power trade brokering system 100 may be, at least partially, realized by a single server or realized by a plurality of servers. Each unit of the electric power trade brokering system 100 may be, at least partially, realized on a virtual server or cloud system. Each unit of the electric power trade brokering system 100 may be, at least partially, realized by a personal computer or mobile terminal. Examples of the mobile terminal may include a mobile phone, a smartphone, a PDA, a tablet, a notebook computer or laptop computer, a wearable computer and the like. The electric power trade brokering system 100 may utilize a distributed ledger technology or distributed network such as a block chain to store information.

If at least part of the components that constitutes the electric power trade brokering system 100 is realized by software, the components realized by the software may be realized by activating software or a program specifying operations about the components in a generally configured information processing device. The above-mentioned information processing device may include: (i) a data processing device having a processor such as a CPU or a GPU, a ROM, a RAM, a communication interface and the like; (ii) an input device such as a keyboard, a touch panel, a camera, a microphone, various types of sensor or a GPS receiver; (iii) an output device such as a display device, a speaker or a vibration device; and (iv) a storage device such as a memory or a HDD (including an external storage device). In the above-mentioned information processing device, the above-mentioned data processing device or storage device may store thereon the above-mentioned software or program. By being executed by a processor, the above-mentioned software or program causes the above-mentioned information processing device to execute the operations specified by the software or program. The above-mentioned software or program may be stored on a non-transitory computer-readable recording medium.

[Outline of Electric Power Trade Managing System 200]

Figure 2:
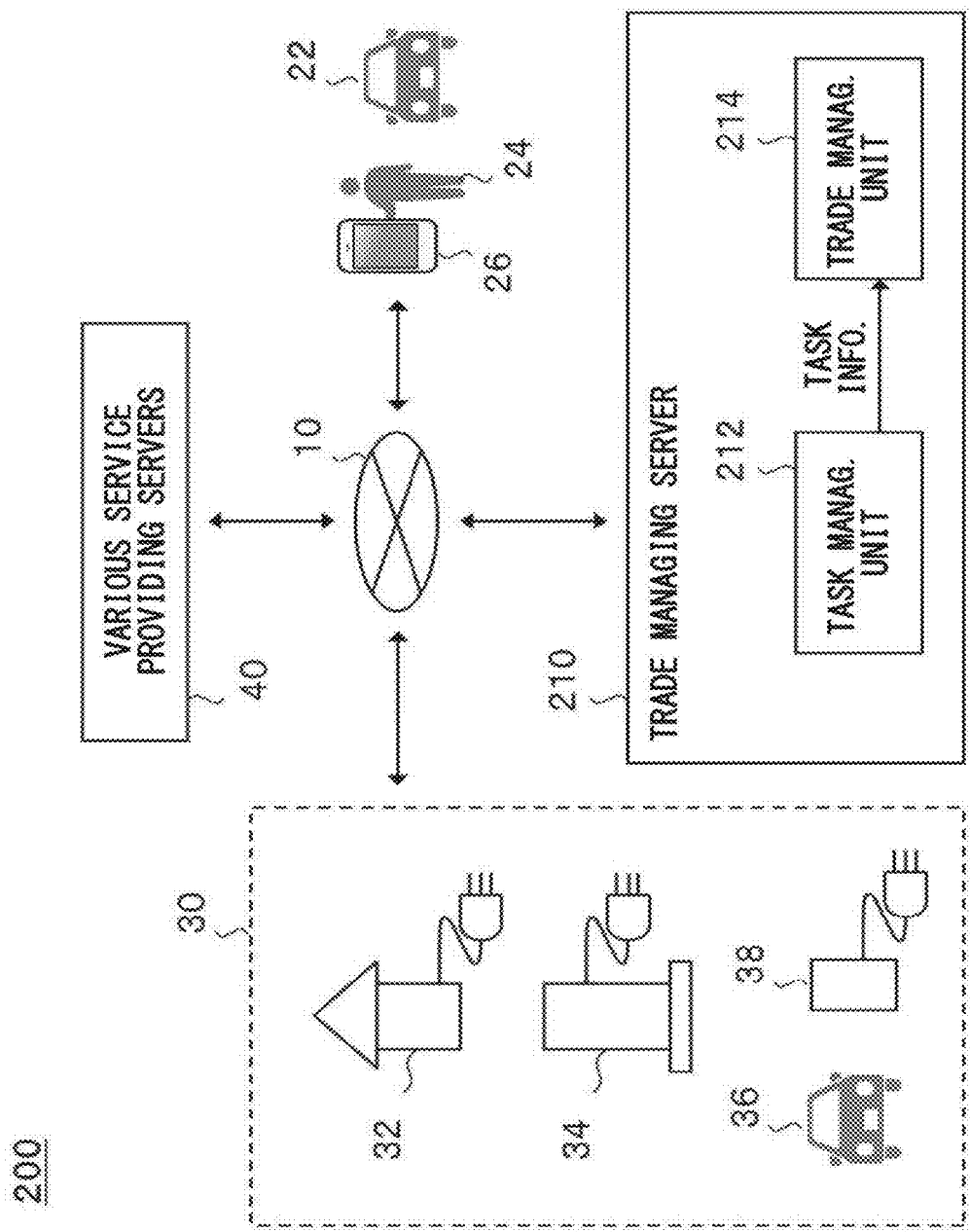
FIG. 2 schematically shows one example of the system configuration of an electric power trade managing system 200.

FIG. 2 schematically shows one example of the system configuration of an electric power trade managing system 200. In the present embodiment, the electric power trade managing system 200 includes a trade managing server 210. The trade managing server 210 includes a task managing unit 212 and a trade managing unit 214. In the present embodiment, the task managing unit 212 and the trade managing unit 214 can transmit and receive information to and from each other. The trade managing server 210 manages electric power trades carried out between an electric power supply side and an electric power receiving side. For example, the trade managing server 210 acts as a broker between the electric power supply side and the electric power receiving side to make an electric power trade. The trade managing server 210 may manage the progress status of the electric power trade having been made. The trade managing server 210 may adjust cost generated accompanying the electric power trade having been made and carry out a settlement process of the cost.

In the explanation with reference to FIG. 2, for the purpose of enhancing the understanding about the electric power trade managing system 200, one embodiment of the electric power trade managing system 200 is explained referring to as an example a case where the trade managing server 210: (i) acquires information about a plurality of plans of a user 24 of an electric automobile 22; (ii) determines a schedule and location of one or more electric power trades according to a plan of the user 24; and (iii) carries out a brokering process (which may be sometimes referred to as a matching process) to determine one trade counterparty 30 for each electric power trade from a plurality of candidates that can be a trade counterparty 30. Examples of the trade counterparty 30 may include a building 32, an electric power charging station 34, an electric automobile 36 or portable electric power supply equipment 38, or users of them. The electric power charging station 34 may be one example of a fixed electric power supply facility.

The electric automobile 22 may be one example of a moving body on which a storage battery is mounted and that is movable by utilizing electric power provided from the storage battery. The trade counterparty 30 and its specific examples may be one example of one or more candidates or a counterparty. The trade managing server 210 may be one example of an electric power trade brokering system. The task managing unit 212 may be one example of a task information acquiring unit. The trade managing unit 214 may be one example of a trade counterparty determining unit.

In the embodiment shown in FIG. 2, the trade managing server 210 transmits and receives information to and from a communication terminal 26 of the user 24 via a communication network 10. The trade managing server 210 transmits and receives information to and from one or more service providing server 40 via the communication network 10. In the present embodiment, the trade managing server 210 transmits and receives information to and from a communication device of one or more trade counterparties 30 via the communication network 10. The communication device of a trade counterparty 30: (i) may be a communication instrument incorporated into the building 32, the electric power charging station 34, the electric automobile 36 or the portable electric power supply equipment 38; or (ii) may be a communication terminal of a user of the building 32, the electric power charging station 34, the electric automobile 36 or the portable electric power supply equipment 38. Examples of the communication terminal of a user may include a personal computer, a mobile terminal and the like. Examples of the mobile terminal may include a mobile phone, a smartphone, a PDA, a tablet, a notebook computer or laptop computer, a wearable computer and the like.

In the present embodiment, the communication network 10 may be a wired communication transmission path, a wireless communication transmission path, or a combination of a wireless communication transmission path and a wired communication transmission path. The communication network 10 may include a wireless packet communication network, the Internet, a P2P network, a private line, a VPN and the like. The communication network 10: (i) may include a mobile communication network such as a mobile phone line network; and (ii) may include a wireless communication network such as a wireless MAN (for example, WiMAX (registered trademark)), a wireless LAN (for example, WiFi (registered trademark)), Bluetooth (registered trademark), Zigbee (registered trademark) or NFC (Near Field Communication).

In the present embodiment, the communication terminal 26 transmits and receives information to and from the electric automobile 22 via the communication network 10. The communication terminal 26 may transmit and receives information to and from the electric automobile 22 by short range wireless communication or wired communication. Examples of the short range wireless communication may include a wireless MAN (for example, WiMAX (registered trademark)), a wireless LAN (for example, WiFi (registered trademark)), Bluetooth (registered trademark), Zigbee (registered trademark), NFC (Near Field Communication) and the like. The communication terminal 26 transmits and receives information to and from the communication device of the trade counterparty 30 via the communication network 10. The communication terminal 26 may transmit and receive information to and from the service providing server 40 via the communication network 10.

The communication terminal 26 may be realized by hardware or realized by hardware and software. Examples of the communication terminal 26 may include a personal computer, a mobile terminal and the like. Examples of the mobile terminal may include a mobile phone, a smartphone, a PDA, a tablet, a notebook computer or laptop computer, a wearable computer and the like. The communication terminal 26 may utilize a distributed ledger technology or distributed network such as a block chain to store information.

If at least part of the components that constitutes the communication terminal 26 is realized by software, the components realized by the software may be realized by activating software or a program specifying operations about the components in a generally configured information processing device. The above-mentioned information processing device may include: (i) a data processing device having a processor such as a CPU or a GPU, a ROM, a RAM, a communication interface and the like; (ii) an input device such as a keyboard, a touch panel, a camera, a microphone, various types of sensor or a GPS receiver; (iii) an output device such as a display device, a speaker or a vibration device; and (iv) a storage device such as a memory or a HDD (including an external storage device).

In the above-mentioned information processing device, the above-mentioned data processing device or storage device may store thereon the above-mentioned software or program. By being executed by a processor, the above-mentioned software or program causes the above-mentioned information processing device to execute the operations specified by the software or program. The above-mentioned software or program may be stored on a non-transitory computer-readable recording medium. In one embodiment, the communication terminal 26 is realized by each of a program for the electric power supply side and a program for the electric power receiving side being installed on a general information processing device. In another embodiment, the communication terminal 26 is realized by a program having a function for both the electric power supply side and the electric power receiving side being installed on a general information processing device.

In the present embodiment, the service providing server 40 provides various types of service to a user having accessed the server. For example, the service providing server 40 provides various types of Web service or cloud service. Examples of the services provided by the service providing server 40 include a schedule management service or task management service, a ride sharing service and the like.

In the present embodiment, the task managing unit 212 manages tasks of the electric automobile 22. The task managing unit 212 acquires task information about one or more tasks of the electric automobile 22. For example, the task managing unit 212 acquires task information of the electric automobile 22 from at least one of the communication terminal 26 and the service providing server 40. The task managing unit 212 may acquire task information based on information about a plan of the user 24. The task managing unit 212 transmits the task information to the trade managing unit 214.

In the present embodiment, the trade managing unit 214 manages an electric power trade related to the electric automobile 22. For example, taking a plan of the user 24 into consideration, the trade managing unit 214 determines whether an electric power trade is necessary or not or is possible or not. If having determined to carry out an electric power trade, the trade managing unit 214 determines a schedule and location for each among one or more electric power trades related to the electric automobile 22 according to the plan of the user 24. Also, the trade managing unit 214 determines a trade counterparty 30 for each among the one or more electric power trades.

In the present embodiment, the trade managing unit 214 brokers conclusion of a contract about an electric power trade between the user 24 and one or more trade counterparties 30. For example, the trade managing unit 214 performs matching between registration information of the electric power supply side and registration information of the electric power receiving side to extract information that matches a particular condition. The electric automobile 22 or user 24 may be registered as the electric power supply side, or may be registered as the electric power receiving side.

In the present embodiment, the trade managing unit 214 generates trade information indicating a plan of one or more electric power trades. The trade information includes, for example, (i) information indicating a position where each electric power trade is carried out, (ii) information indicating a date and time or a time on or at which each electric power trade is carried out, and (iii) information indicating a party of each electric power trade. The information indicating a party of each electric power trade may include at least information indicating a trade counterparty 30.

[Specific Configuration of Each Unit of Electric Power Trade Managing System 200]

Each unit of the electric power trade managing system 200 may be realized by hardware, realized by software, or realized by hardware and software. Each unit of the electric power trade managing system 200 may be, at least partially, realized by a single server or realized by a plurality of servers. Each unit of the electric power trade managing system 200 may be, at least partially, realized on a virtual server or cloud system. Each unit of the electric power trade managing system 200 may be, at least partially, realized by a personal computer or mobile terminal. Examples of the mobile terminal may include a mobile phone, a smartphone, a PDA, a tablet, a notebook computer or laptop computer, a wearable computer and the like. The electric power trade managing system 200 may utilize a distributed ledger technology or distributed network such as a block chain to store information.

If at least part of the components that constitutes the electric power trade managing system 200 is realized by software, the components realized by the software may be realized by activating software or a program specifying operations about the components in a generally configured information processing device. The above-mentioned information processing device may include: (i) a data processing device having a processor such as a CPU or a GPU, a ROM, a RAM, a communication interface and the like; (ii) an input device such as a keyboard, a touch panel, a camera, a microphone, various types of sensor or a GPS receiver; (iii) an output device such as a display device, a speaker or a vibration device; and (iv) a storage device such as a memory or a HDD (including an external storage device). In the above-mentioned information processing device, the above-mentioned data processing device or storage device may store thereon the above-mentioned software or program. By being executed by a processor, the above-mentioned software or program causes the above-mentioned information processing device to execute the operations specified by the software or program. The above-mentioned software or program may be stored on a non-transitory computer-readable recording medium.

Figure 3:
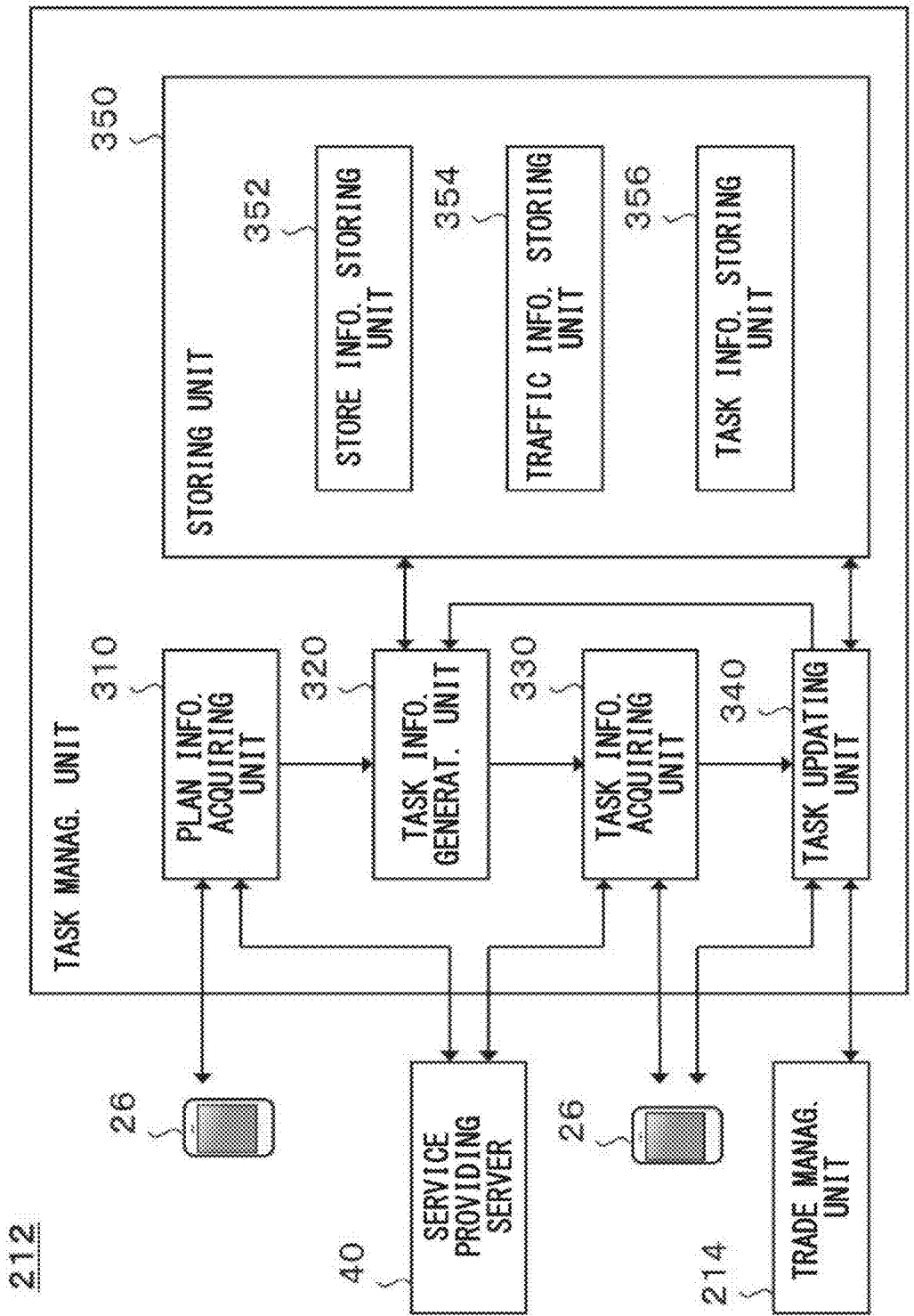
FIG. 3 schematically shows one example of the internal configuration of a task managing unit 212.

FIG. 3 schematically shows one example of the internal configuration of the task managing unit 212. In the present embodiment, the task managing unit 212 includes a plan information acquiring unit 310, a task information generating unit 320, a task information acquiring unit 330, a task updating unit 340 and a storing unit 350. In the present embodiment, the storing unit 350 has a store information storing unit 352, a traffic information storing unit 354 and a task information storing unit 356. Each unit of the task managing unit 212 may transmit and receive information to and from another unit in directions not limited to those of the arrows shown in FIG. 3. The task updating unit 340 may be one example of a change determining unit.

In the present embodiment, the plan information acquiring unit 310 acquires information about a plan of the user 24 (which may be sometimes referred to as plan information). The plan information acquiring unit 310 may acquire information about a plurality of plans of the user 24. The plan information includes, for example, information indicating details of a plan, information indicating a position where the plan is implemented and information indicating a date and time or a time on or at which the plan is implemented. The plan information acquiring unit 310 transmits the plan information to the task information generating unit 320.

In one embodiment, the plan information acquiring unit 310 acquires plan information of the user 24 from the communication terminal 26. For example, if the user 24 inputs a plan on an input screen displayed on a display device of the communication terminal 26, the communication terminal 26 accepts the input from the user, and transmits the input to the plan information acquiring unit 310. The plan information acquiring unit 310 may generate the above-mentioned input screen and transmit it to the communication terminal 26. A program installed on the communication terminal 26 may generate the above-mentioned input screen. The plan information acquiring unit 310 acquires, as the plan information, the information received from the communication terminal 26.

In another embodiment, the plan information acquiring unit 310 acquires the plan information of the user 24 from the service providing server 40. For example, if the service providing server 40 provides a schedule management service or task management service, the plan information acquiring unit 310 accesses the service providing server 40 to acquire information about a schedule or task of the user 24. If the user 24 registers the schedule or task in the service providing server 40, the service providing server 40 may transmit information about the schedule or task of the user 24 to the plan information acquiring unit 310. The plan information acquiring unit 310 acquires, as the plan information, the information received from the service providing server 40.

If the service providing server 40 provides a ride sharing service, the plan information acquiring unit 310 accesses the service providing server 40 to acquire information about a position and a date and time or a time on or at which the user 24 picks up a planned fellow passenger (which may be sometimes referred to as pick-up information). If there is an agreement between the matching user 24 and planned fellow passenger, the service providing server 40 may transmit the pick-up information to the plan information acquiring unit 310. The plan information acquiring unit 310 acquires, as the plan information, the information received from the service providing server 40.

In the present embodiment, the task information generating unit 320 receives the plan information from the plan information acquiring unit 310. The task information generating unit 320 generates information about a task of the electric automobile 22 (which may be sometimes referred to as task information) based on the plan information. The task information generating unit 320 may generate task information about a plurality of tasks of the electric automobile 22 based on the plan information. The task information generating unit 320 may store the generated task information in the task information storing unit 356.

In one embodiment, the task information generating unit 320 may calculate a time at which a task is carried out from a time at which a plan is implemented, based on a predetermined setting. Information indicating how many minutes before a time at which a plan is implemented a user should arrive at a location where a plan is implemented, and information indicating the type of the plan may be stored in the predetermined setting in association with each other. For example, based on plan information "Watch Movie Z at Movie Theater B that starts at 2 p.m." and a setting indicating "If a plan is a movie, a public performance, a lecture or the like, arrive at the venue 20 minutes before the starting time of the movie, etc.," the task information generating unit 320 generates task information "Arrive at Movie Theater B before 1:40 p.m." The task managing unit 212 or the communication terminal 26 may store the above-mentioned setting for each user.

In another embodiment, the task information generating unit 320 may determine the position where each among one or more tasks is carried out and the order in which the one or more tasks are carried out, and generate task information including information about the position and time at which each task is carried out. The task information generating unit 320 may determine the position where each among one or more tasks is carried out and the order in which the one or more tasks are carried out based on at least one of store information stored in the store information storing unit 352 and traffic information stored in the traffic information storing unit 354. The traffic information includes, for example, map information, traffic jam information or the like. The store information includes, for each among one or more stores, for example, information about the position of each store, the type and details of services that each store provides, or the like.

In the present embodiment, the task information generating unit 320 may determine the position where each among one or more tasks is carried out and the order in which the one or more tasks are carried out based on at least one of store information stored in the store information storing unit 352 and traffic information stored in the traffic information storing unit 354, and on a predetermined setting like the one described above. The trade counterparty 30 may acquire at least one of the store information and the traffic information from another server.

For example, based on plan information "Watch Movie Z" and "Have supper at Restaurant A from 7 p.m.," the task information generating unit 320 generates task information "Arrive at Movie Theater B before 1:40 p.m.," "Leave Movie Theater B before 6 p.m." and "Arrive at Restaurant A before 6:50 p.m." Although the above-mentioned procedure of generating the task information is not particularly limited, the task information generating unit 320 generates the above-mentioned task information for example by the following procedure. The task information generating unit 320 may generate the above-mentioned task information by partially omitting the procedure, adding another procedure, or changing the order of procedures.

A plan included in plan information in some cases includes a designated position where a plan is implemented (which may be sometimes referred to as an implementation position) and in other cases does not include a designated implementation position of a plan. Likewise, a plan included in plan information in some cases includes a designated time at which a plan is implemented (which may be sometimes referred to as an implementation time) and in other cases does not include a designated implementation time of a plan. In view of this, the task information generating unit 320 first generates task information based on plan information about a plan for which an implementation time is designated, and on a predetermined setting. Thereby, task information "Arrive at Restaurant A before 6:50 p.m." is generated from plan information "Have supper at Restaurant A from 7 p.m."

At this time, based on positional information of a current position of the electric automobile 22, positional information of Restaurant A, and traffic information stored in the traffic information storing unit 354, the task information generating unit 320 may judge whether or not it is possible to arrive at Restaurant A before 6:50 p.m. If a judgment result that it is not possible to arrive at Restaurant A before 6:50 p.m. is obtained, the task information generating unit 320 transmits the judgment result to the communication terminal 26 to cause it to output text, an icon or screen, or a sound for notifying the user 24 of the judgment result. On the other hand, if a judgment result that it is possible to arrive at Restaurant A before 6:50 p.m. is obtained, a procedure for generating a next task is executed.

Next, the task information generating unit 320 refers to the store information stored in the store information storing unit 352 and the traffic information stored in the traffic information storing unit 354 to extract a store that satisfies both the conditions about the task "Arrive at Restaurant A before 6:50 p.m." and the plan "Watch Movie Z" from one or more stores registered in the store information storing unit 352. Specifically, a movie theater is extracted (i) which is a movie theater that is screening Movie Z; (ii) where the user can arrive before Movie Z starts if the user leaves the current position of the electric automobile 22 now, and (iii) which allows the user to arrive at Restaurant A before 6:50 p.m. if the user leaves the movie theater when Movie Z ended.

If in the above-mentioned extraction process, a movie theater that satisfies the above-mentioned conditions is not extracted, the task information generating unit 320 for example transmits the extraction result to the communication terminal 26 to cause it to output a screen or a sound for notifying the user 24 of the extraction result. On the other hand, if a movie theater that satisfies the above-mentioned conditions is extracted, the task information generating unit 320 generates, from the plan information "Watch Movie Z," task information "Arrive at Movie Theater B before 1:40 p.m." and "Leave Movie Theater B before 6 p.m.," for example. The task information generating unit 320 may transmit the generated task information to the task information acquiring unit 330.

If a plurality of movie theaters are extracted as stores satisfying the above-mentioned conditions, the task information generating unit 320 extracts one movie theater based on a predetermined setting. For example, the task information generating unit 320 extracts a candidate that minimizes or maximizes a particular parameter from a plurality of candidates. The task information generating unit 320 may extract a predetermined number of candidates from a plurality of candidates in the ascending order of a particular parameter or in the descending order of the parameter. In this case, the task information generating unit 320 may transmit the extraction result to the communication terminal 26 to cause it to output text, an icon or screen, or a sound for allowing the user 24 to select one candidate from the extracted plurality of candidates. The task information generating unit 320 may acquire, from the communication terminal 26, information indicating a result of selection made by the user 24. Examples of the particular parameter include a moving distance, electric power consumption amount, various types of fee, moving time, period from a current time to a starting time of a plan, period from a planned time of arrival at a position where a plan is implemented to a starting time of the plan, period from an end time of a plan to a next plan, and the like.

In the present embodiment, the task information generating unit 320 re-generates task information if it became necessary to change an existing task related to the electric automobile 22. For example, if it is judged necessary for the task updating unit 340 to change an existing task related to the electric automobile 22, the task information generating unit 320 determines the position where each among one or more tasks after the change is made is carried out and the order in which the one or more tasks are carried out, and generates new task information including information about the position where each among the one or more tasks after the change is made is carried out and the times at which the one or more tasks are carried out.

In the present embodiment, the task information acquiring unit 330 acquires task information of the electric automobile 22. The task information acquiring unit 330 may acquire task information generated by the task information generating unit 320. The task information acquiring unit 330 may acquire task information of the electric automobile 22 from the communication terminal 26. The task information acquiring unit 330 may acquire task information of the electric automobile 22 from the service providing server 40. The task information acquiring unit 330 may acquire the task information from the communication terminal 26 or the service providing server 40 by a procedure similar to the procedure of the plan information acquiring unit 310 acquiring plan information from the communication terminal 26 or the service providing server 40. In the present embodiment, the task information acquiring unit 330 transmits the task information to the task updating unit 340.

In the present embodiment, task information stored in the task information storing unit 356 is updated. For example, the task updating unit 340 receives task information from the task information acquiring unit 330 to store the task information in the task information storing unit 356. The task updating unit 340 may transmit task information stored in the task information storing unit 356 to the trade managing unit 214. The task updating unit 340 may transmit the task information stored in the task information storing unit 356 to the trade managing unit 214 in response to a request from the trade managing unit 214.

The task updating unit 340 may receive, from the communication terminal 26 or the service providing server 40, information indicating that existing task information has been deleted or a request to delete the existing task information, and delete the task information stored in the task information storing unit 356. The task updating unit 340 may receive, from the communication terminal 26 or the service providing server 40, information indicating that details of existing task information has been changed or a request to change the details of the existing task information, and change details of the task information stored in the task information storing unit 356.

In the present embodiment, the task updating unit 340 determines whether it is necessary or not to change a task related to the electric automobile 22. More specifically, the task updating unit 340 judges whether or not it is necessary to change one task related to the electric automobile 22 following a change in information of another task related to the electric automobile 22.

In one embodiment, the task updating unit 340 judges whether or not it is necessary to change a task related to the electric automobile 22 due to addition of information about another new task related to the electric automobile 22 if the new task information is received from the task information acquiring unit 330. In another embodiment, if having received, from the communication terminal 26 or the service providing server 40, information indicating that existing task information has been deleted or a request to delete the existing task information, the task updating unit 340 judges whether or not it is necessary to change another task related to the electric automobile 22 due to the existing task information being deleted.

In still another embodiment, if having received, from the communication terminal 26 or the service providing server 40, information indicating that details of existing task information have been changed or a request to change the details of the existing task information, the task updating unit 340 judges whether or not it is necessary to change another task related to the electric automobile 22 due to the details of the existing task information having been changed. Examples of changing the details of the task information may include changing a position where a task is carried out, changing a date and time or a time on or at which a task is carried out, changing a period in which a task is carried out and the like.

In the present embodiment, the task updating unit 340 transmits, to the trade managing unit 214, an instruction for the trade managing unit 214 to carry out an electric power trade brokering process. In one embodiment, the task updating unit 340 receives, from the communication terminal 26, an instruction for the trade managing server 210 to carry out an electric power trade brokering process. Upon receiving the above-mentioned instruction from the communication terminal 26, the task updating unit 340 transmits, to the trade managing unit 214, an instruction for the trade managing unit 214 to carry out an electric power trade brokering process. In another embodiment, if having judged that it is necessary to change an existing task related to the electric automobile 22, the task updating unit 340 transmit, to the trade managing unit 214, an instruction for the trade managing unit 214 to carry out an electric power trade brokering process.

In the present embodiment, the task updating unit 340 reminds the user 24 of the existence of one task before a planned time of the one task. For example, the task updating unit 340 transmits information about one task to a computer of the electric automobile 22 or the communication terminal 26 of the user 24 at or after a time a predetermined length of time before a planned time of the one task, and before or at the planned time. At this time, the task updating unit 340 may transmit, to the computer of the electric automobile 22 or the communication terminal 26 of the user 24, information for prompting the user 24 to transmit information indicating that the above-mentioned task is to be carried out as planned or information indicating that the task is to be changed.

In the present embodiment, the storing unit 350 stores therein various types of information. For example, the store information storing unit 352 stores therein various pieces of information about one or more stores (which may be sometimes referred to as store information). The traffic information storing unit 354 stores therein various types of traffic information. The task information storing unit 356 stores therein one or more pieces of task information about each among one or more moving bodies.

In the present embodiment, a case where each unit of the trade managing server 210 refers to information stored in the storing unit 350 to execute various types of processing is explained. However, information processing in the trade managing server 210 is not limited to the present embodiment. Each unit of the trade managing server 210 may refer to information stored in an external database to execute various types of information processing. Each unit of the trade managing server 210 may refer to information stored in a distributed database utilizing a block chain technology to execute various types of information processing.

Figure 4:
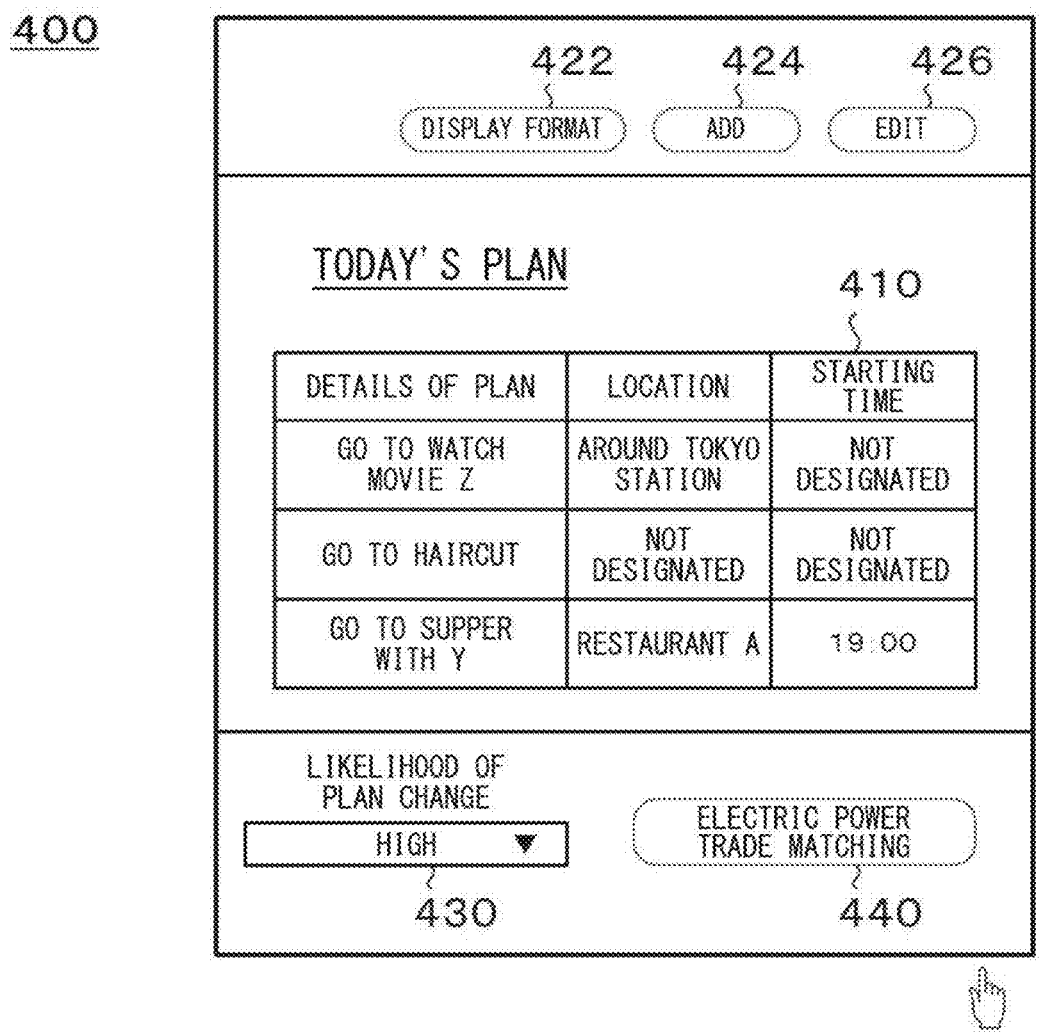
FIG. 4 schematically shows one example of an input screen 400.

FIG. 4 schematically shows one example of an input screen 400. The input screen 400 may be one example of a screen displayed on a display screen of the communication terminal 26. The input screen 400 may be one example of a user interface of the electric power trade managing system 200. The input screen 400 may be one example of a screen for prompting the user 24 to input a plan.

In the present embodiment, the input screen 400 includes a display module 410 for displaying a plan of the user 24 to be implemented in a designated period. The display module 410 displays, for example, information about a plan such as details, a location, a starting time, an end time, a required length of time or a companion. In the present embodiment, the input screen 400 includes: an icon 422 incorporating an instruction for allowing the user 24 to designate a display format of the display module 410; an icon 424 incorporating an instruction for adding a plan; and an icon 426 incorporating an instruction for editing a plan. Examples of the editing operation may include (i) changing details, a location, a starting time, a required length of time or the like of the plan, (ii) deleting the plan, and the like.

In the present embodiment, the input screen 400 may include: an icon 430 incorporating an instruction for allowing a user to designate the degree of likelihood of a plan to be changed; and an icon 440 incorporating an instruction for causing the trade managing server 210 to carry out an electric power trade brokering process. For example, if the user 24 clicks or taps the icon 440 to execute an instruction incorporated in the icon 440, the trade managing server 210 determines whether or not to carry out one or more electric power trades while at least one among one or more plans displayed on the display module 410 is being executed. Also, if having determined to carry out one or more electric power trades, the trade managing server 210 determines a counterparty of each electric power trade.

In this case, the trade managing server 210 may consider the degree of likelihood of a plan to be changed to determine a counterparty of an electric power trade. For example, if the likelihood of the plan to be changed is high, among candidates of a trade counterparty, a candidate that requires less cost if an electric power trade is cancelled is extracted as a trade counterparty. The degree of likelihood of a plan to be changed may be one example of a parameter related to the amount of cost generated accompanying cancellation of an electric power trade.

FIG. 5 schematically shows one example of a data table 500. The data table 500 is stored for example in the task information storing unit 356. In the present embodiment, the data table 500 stores, in association with each other, a moving body ID 502, a task ID 504 and task information 506. The task information 506 includes, for example, information about a position 512, a time 514 and an action 516. Each of records that constitutes the data table 500 may be one example of task information.

Figure 6:
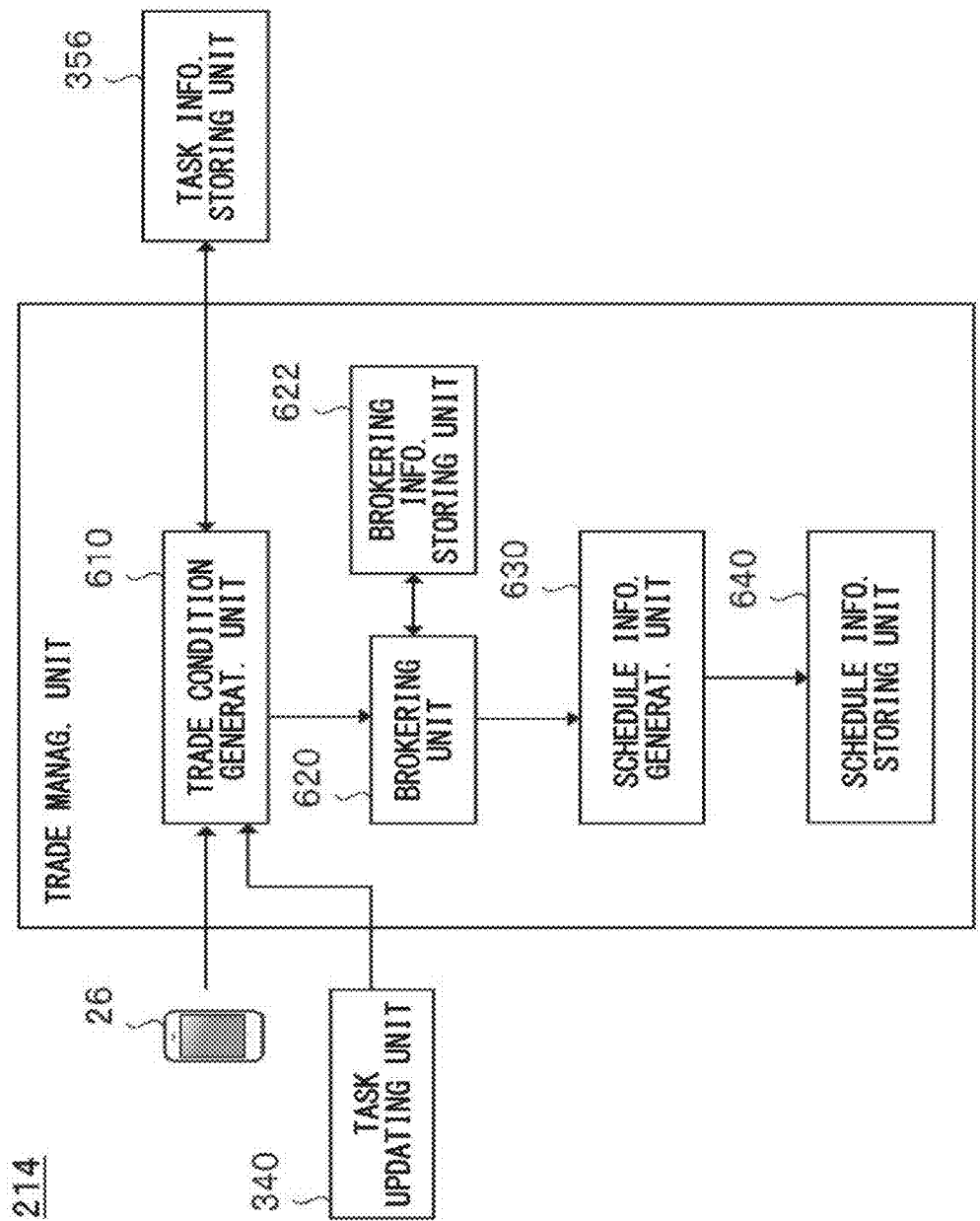
FIG. 6 schematically shows one example of the internal configuration of a trade managing unit 214.

FIG. 6 schematically shows one example of the internal configuration of the trade managing unit 214. In the present embodiment, the trade managing unit 214 includes a trade condition generating unit 610, a brokering unit 620, a brokering information storing unit 622, a schedule information generating unit 630 and a schedule information storing unit 640. Each unit of the trade managing unit 214 may transmit and receive information to and from another unit in directions not limited to those of the arrows shown in FIG. 6. The trade condition generating unit 610 may be one example of an extraction condition determining unit. The brokering unit 620 may be one example of an extracting unit. The brokering information storing unit 622 may be one example of a trade condition storing unit. The schedule information generating unit 630 may be one example of a trade schedule determining unit.

In the present embodiment, the trade condition generating unit 610 generates a trade condition on the side of the electric automobile 22 used in a matching process at the brokering unit 620. For example, for at least one task among a plurality of tasks related to the electric automobile 22, the trade condition generating unit 610 determines, based on task information of the electric automobile 22, (i) an electric power amount that the electric automobile 22 can trade and (ii) a period in which the electric automobile 22 can trade electric power, at a position where the task is carried out. The trade condition generating unit 610 may determine a maximum value of an amount of electric power that can be traded or may determine a minimum value and a maximum value of an amount of electric power that can be traded.

The trade condition generating unit 610 may determine other trade conditions. Examples of the other trade conditions may include a condition about the standard or quality of electric power to be traded, a condition about the fee of electric power to be traded, a condition about whether or not cancellation of a trade is permitted, and the like. Examples of the standard or quality of electric power to be traded may include rated voltage, rated power, the degree of voltage fluctuation, the degree of current fluctuation, the type of an electric power supply facility, and the like. Examples of the fee of electric power to be traded may include the cost of an entire trade, the unit price of electric power to be traded, the cancellation fee accompanying if a trade is cancelled, the compensation cost accompanying if a trade is terminated before completion, and the like. Examples of the unit price of electric power to be traded may include the unit price in a case where cancellation of a trade is permitted, the unit price in a case where cancellation of a trade is not permitted, and the like.

The trade condition generating unit 610 may generate a trade condition about a single task among a plurality of tasks related to the electric automobile 22. The trade condition generating unit 610 may generate a trade condition about a plurality of tasks among a plurality of tasks related to the electric automobile 22.

As mentioned above, addition of a task related to the electric automobile 22 may influence an existing task related to the electric automobile 22. Also, a change in details of one task related to the electric automobile 22 may influence another task related to the electric automobile 22. In this case, the trade condition generating unit 610 may determine a trade condition again about one or more tasks after the change is made. For example, for at least one task among one or more tasks after the change is made, the trade condition generating unit 610 determines (i) an electric power amount that the electric automobile 22 can trade and (ii) a period in which the electric automobile 22 can trade electric power, at a position where the task is carried out. The trade condition generating unit 610 may determine other trade conditions.

According to one embodiment, if an existing task of the electric automobile 22 needs to be changed, the task information generating unit 320 generates new task information related to one or more tasks after the change is made, and stores the new task information in the task information storing unit 356. The trade condition generating unit 610 accesses the task information storing unit 356 to acquire the new task information. For at least one task among one or more tasks after the change is made, the trade condition generating unit 610 determines, based on the new task information, (i) an electric power amount that the electric automobile 22 can trade and (ii) a period in which the electric automobile 22 can trade electric power, at a position where the task is carried out. The trade condition generating unit 610 may determine other trade conditions.

In the present embodiment, the brokering unit 620 compares a trade condition presented by the electric automobile 22 with a trade condition presented by each among a plurality of candidates that can be a trade counterparty 30 to perform matching among them. The trade condition presented by each among the plurality of candidates that can be a trade counterparty 30 is preregistered for example in the brokering information storing unit 622. Each among a plurality of candidates that can be a trade counterparty 30 may be one example of a plurality of preregistered candidates. Triggered by reception of a trade condition on the electric automobile 22 side from the trade condition generating unit 610, the brokering unit 620 may execute a matching process. The brokering unit 620 transmits an extraction result to the schedule information generating unit 630.

According to one embodiment, the brokering unit 620 extracts, from a plurality of candidates, a candidate that satisfies a trade condition generated by the trade condition generating unit 610. For example, the brokering unit 620 extracts one or more candidates that can trade an electric power amount of electric power determined in a trade condition in a period determined in the trade condition at a position where a task related to the trade condition is carried out.

If a plurality of candidates satisfy a trade condition, the brokering unit 620 may determine one candidate as a trade counterparty based on a predetermined setting. According to one embodiment, the brokering unit 620 extracts a candidate that minimizes or maximizes a particular parameter from a plurality of candidates. According to another embodiment, the brokering unit 620 may extract a predetermined number of candidates from a plurality of candidates in the ascending order of a particular parameter or in the descending order of the parameter. In this case, the brokering unit 620 may transmit the extraction result to the communication terminal 26 to cause it to output text, an icon or screen, or a sound for allowing the user 24 to select one candidate from the extracted plurality of candidates. The brokering unit 620 may acquire, from the communication terminal 26, information indicating a result of selection made by the user 24. Examples of the particular parameter may include a fee, a length of time required for a trade and the like.

In the present embodiment, the brokering information storing unit 622 stores therein information to be used in a brokering process of the brokering unit 620. The brokering information storing unit 622 stores therein for example an electric power supply side trade condition and an electric power receiving side trade condition. As an electric power supply side condition, identification information of each candidate and at least one of information about whether cancellation of a trade is possible or not and information about a cost increase accompanying cancellation of the trade are stored in association with each other for each among a plurality of candidates that can be an electric power supply side party.

In the present embodiment, the schedule information generating unit 630 acquires information about one or more candidates extracted by the brokering unit 620. The schedule information generating unit 630 determines a position, period and counterparty of one or more electric power trades so as to satisfy a predetermined condition based on the above-mentioned information about the one or more candidates. Triggered by acquisition of the information about one or more candidates extracted by the brokering unit 620, the schedule information generating unit 630 may execute the above-mentioned process.

Examples of the predetermined condition may include a condition that the sum of particular parameter becomes minimum or maximum if all tasks designated by the user 24 are executed, a condition that the sum of particular parameter is within a predetermined range if all tasks designated by the user 24 are executed, and the like. Examples of the particular parameter may include a moving distance, electric power consumption amount, various types of fee, moving time, a period from a current time to a starting time of a plan, a period from a planned time of arrival at a position where a plan is implemented to a starting time of the plan, a period from an end time of a plan to a next plan, and the like.

Thereby, for example, if the user 24 has three plans, Plan A, Plan B and Plan C, in a period designated by the user 24, a schedule like the following one can be created for an electric power trade:

(i) while the user 24 is implementing Plan A, charge a storage battery of the electric automobile 22 utilizing electric power supply equipment of a trade counterparty X;

(ii) while the user 24 is implementing Plan B, not carry out an electric power trade; and (iii) while the user 24 is implementing Plan C, supply electric power to an instrument of a trade counterparty Y.

In the present embodiment, the schedule information generating unit 630 generates schedule information including information about a position, period and counterparty of one or more electric power trades. The schedule information generating unit 630 transmits the generated schedule information to the schedule information storing unit 640. The schedule information storing unit 640 stores the schedule information received from the schedule information generating unit 630.

As mentioned above, it becomes necessary in some cases to cancel one or more electric power trades or to change a trade condition because a task related to the electric automobile 22 is added or details of one task related to the electric automobile 22 are changed. In this case, the schedule information generating unit 630 may carry out at least one of an electric power trade cancellation process and a trade condition changing process.

For example, if one task is to be deleted, when at least one among one or more trades related to the task needs to be canceled, the schedule information generating unit 630 determines to cancel a trade with which at least one of a cost generated accompanying cancellation of the trade and an attribute of a counterparty of the trade satisfies a predetermined condition among the above-mentioned one or more trades. Examples of the predetermined condition may include a condition that a cost generated accompanying cancellation of the trade is lower than a predetermined value, a condition that an attribute of a counterparty of a trade is a particular attribute, a condition that an attribute of a counterparty of a trade is not a particular attribute, and the like. Examples of the attribute of a counterparty of a trade may include whether or not the counterparty is a corporation, whether or not the counterparty is an individual, whether or not the counterparty is a business electric power provider and the like.

FIG. 7 schematically shows one example of a data table 700. In the present embodiment, the data table 700 stores a trade ID 702 and a trade information 704 in association with each other. The trade information 704 includes, for example, information about a position 712 where a trade is carried out, a period 714 in which a trade is carried out, an electric power supply side ID 716 for identifying an electric power supply side trade party, an electric power receiving side ID 718 for identifying an electric power receiving side trade party, a trade condition 720 and the like.

Examples of the trade condition 720 may include the standard or quality of electric power to be traded, an electric power amount to be traded, a fee of electric power to be traded, whether or not cancellation of a trade is permitted, and the like. Examples of the fee of electric power to be traded may include the cost of an entire trade, the unit price of electric power to be traded, the cancellation fee accompanying if a trade is cancelled, the compensation cost accompanying if a trade is terminated before completion, and the like. Examples of the unit price of electric power to be traded may include the unit price in a case where cancellation of a trade is permitted, the unit price in a case where cancellation of a trade is not permitted, and the like.

While the embodiments of the present invention have been described, the technical scope of the invention is not limited to the above described embodiments. It is apparent to persons skilled in the art that various alterations and improvements can be added to the above-mentioned embodiments. Also, matters explained about a particular embodiment can be applied to another embodiment, unless such an application causes technical contradictions. It is also apparent from the scope of the claims that the embodiments added with such alterations or improvements can be included in the technical scope of the invention.

The operations, procedures, steps, and stages of each process performed by an device, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An electric power trade brokering system comprising:
a task information acquiring unit that acquires task information about a plurality of tasks of a moving body on which a storage battery is mounted and that is movable by utilizing electric power provided from the storage battery; and
a trade counterparty determining unit that determines, based on the task information acquired by the task information acquiring unit, a counterparty to trade electric power with the moving body at a position where at least one task among the plurality of tasks is carried out, wherein
the task information includes information about a position and time at which each task among the plurality of tasks of the moving body is carried out, and
wherein the trade counterparty determining unit has:
an extraction condition determining unit that determines, for at least one task among the plurality of tasks, a period in which the moving body can trade electric power at a position where the at least one task is carried out based on the task information;
an extracting unit that extracts, from a plurality of preregistered candidates, one or more candidates that can trade electric power with the moving body, in the period determined by the extraction condition determining unit, at the position where the at least one task is carried out; and
a trade schedule determining unit that determines a position, period and counterparty of one or more electric power trades based on information about one or more candidates extracted by the extracting unit.

2. The electric power trade brokering system according to claim 1, further comprising:
a plan information acquiring unit that acquires plan information about a plurality of plans of a user of the moving body; and
a task information generating unit that generates the task information based on the plan information acquired by the plan information acquiring unit.

3. The electric power trade brokering system according to claim 2, wherein
the task information generating unit:
determines, based on the plan information acquired by the plan information acquiring unit, a position where each task among the plurality of tasks of the moving body is carried out and an order in which the plurality of tasks of the moving body are carried out; and
generates the task information based on the position where each task among the plurality of tasks of the moving body is carried out and the order in which the plurality of tasks of the moving body are carried out.

4. The electric power trade brokering system according to claim 3, wherein
the extraction condition determining unit determines, for at least one task among the plurality of tasks, (i) an electric power amount that the moving body can trade and (ii) a period in which the moving body can trade electric power at a position where the at least one task is carried out, based on the task information, the extracting unit extracts, from a plurality of preregistered candidates, one or more candidates that can trade electric power, the electric power amount of which is determined by the extraction condition determining unit, in the period determined by the extraction condition determining unit at the position where the at least one task is carried out, and the trade schedule determining unit determines a position, period and counterparty of one or more electric power trades so as to satisfy a predetermined condition based on information about one or more candidates extracted by the extracting unit.

5. The electric power trade brokering system according to claim 4, further comprising:

a trade condition storing unit that stores, in association with each other, identification information of each candidate, and at least one of information about whether cancellation of a trade is possible or not and information about a cost increase accompanying cancellation of the trade, for each candidate among the plurality of candidates, wherein the extracting unit extracts the one or more candidates from a plurality of candidates stored in the trade condition storing unit.

6. The electric power trade brokering system according to claim 4, further comprising:

a change determining unit that determines whether it is necessary or not to change a task of the moving body, wherein if the change determining unit determines that it is necessary to change a task of the moving body:

for at least one task among one or more tasks after the change is made, the extraction condition determining unit determines (i) an electric power amount of electric power that the moving body can trade and (ii) a period in which the moving body can trade electric power, at a position where the at least one task is carried out;

the extracting unit extracts, from a plurality of preregistered candidates, one or more candidates that can trade electric power, the electric power amount of which is determined by the extraction condition determining unit, in the period determined by the extraction condition determining unit at the position where the at least one task is carried out; and the trade schedule determining unit determines a position, period and counterparty of one or more electric power trades so as to satisfy a predetermined condition based on information about the one or more candidates extracted by the extracting unit.

7. The electric power trade brokering system according to claim 6, wherein if a first task is deleted due to a change in a task of the moving body, when it is necessary to cancel at least one among one or more trades related to the first task:

the trade schedule determining unit determines to cancel a trade that is among the one or more trades related to the first task and satisfies a predetermined second condition about at least one of: a cost generated accompanying cancellation of the trade; and an attribute of a counterparty of the trade.

8. The electric power trade brokering system according to claim 6, wherein if the change determining unit determines that it is necessary to change a task of the moving body:

the task information generating unit:

determines a position where each task among one or more tasks after the change is made is carried out and an order in which the one or more tasks after the change is made are carried out; and generates new task information including information about a position and time at which each task among the one or more tasks after the change is made is carried out; and for the at least one task, the extraction condition determining unit determines, based on the new task information, (i) an electric power amount of electric power that the moving body can trade and (ii) a period in which the moving body can trade electric power, at the position where the task is carried out.

9. The electric power trade brokering system according to claim 6, wherein the change determining unit transmits information about a second task to the moving body or a communication terminal of a user of the moving body at or after a time a predetermined length of time before a planned time of the second task, and before or at the planned time.

10. A non-transitory computer readable medium storing thereon a program that causes a computer to function as an electric power trade brokering system by performing operations comprising:

acquiring, by means of the computer, task information about a plurality of tasks of a moving body on which a storage battery is mounted and that is movable by utilizing electric power stored in the storage battery; and determining, by means of the computer and based on the task information acquired in the acquiring, a counterparty to trade electric power with the moving body at a position where at least one task among the plurality of tasks is carried out, wherein the task information includes information about a position and time at which each task among the plurality of tasks of the moving body is carried out, and wherein determining the counterparty includes:

determining, for at least one task among the plurality of tasks, a period in which the moving body can trade electric power at a position where the at least one task is carried out based on the task information;

extracting, from a plurality of preregistered candidates, one or more candidates that can trade electric power with the moving body, in the period determined during determining the period in which the moving body can trade electric power, at the position where the at least one task is carried out; and determining a position, period and counterparty of one or more electric power trades based on information about one or more candidates extracted during extracting the one or more candidates.

11. An electric power trade brokering method comprising:

acquiring, by means of a computer, task information about a plurality of tasks of a moving body on which a storage battery is mounted and that is movable by utilizing electric power stored in the storage battery; and determining, by means of a computer and based on the task information acquired in the acquiring, a counterparty to trade electric power with the moving body at a position where at least one task among the plurality of tasks is carried out, wherein the task information includes information about a position and time at which each task among the plurality of tasks of the moving body is carried out, and wherein determining the counterparty includes:
- determining, for at least one task among the plurality of tasks, a period in which the moving body can trade electric power at a position where the at least one task is carried out based on the task information;
- extracting, from a plurality of preregistered candidates, one or more candidates that can trade electric power with the moving body, in the period determined during determining the period in which the moving body can trade electric power, at the position where the at least one task is carried out; and
- determining a position, period and counterparty of one or more electric power trades based on information about one or more candidates extracted during extracting the one or more candidates.

* * * * *